US007875659B2

(12) United States Patent
Kulkarni et al.

(10) Patent No.: US 7,875,659 B2
(45) Date of Patent: Jan. 25, 2011

(54) WATER-SOLUBLE MACROMONOMERS CONTAINING TERMINAL UNSATURATION AND A PROCESS FOR THE PREPARATION THEREOF

(75) Inventors: Mohan Gopalkrishna Kulkarni, Maharashtra (IN); Prerana Maruti Patil, Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 165 days.

(21) Appl. No.: 12/280,225

(22) PCT Filed: Mar. 28, 2007

(86) PCT No.: PCT/IN2007/000125

§ 371 (c)(1),
(2), (4) Date: Aug. 21, 2008

(87) PCT Pub. No.: WO2007/110882

PCT Pub. Date: Oct. 4, 2007

(65) Prior Publication Data

US 2009/0221729 A1 Sep. 3, 2009

(30) Foreign Application Priority Data

Mar. 28, 2006 (IN) .......................... 848/DEL/2006

(51) Int. Cl.
C08F 2/38 (2006.01)
(52) U.S. Cl. ............................. 522/88; 522/89; 522/188
(58) Field of Classification Search .................. 522/88, 522/89, 188
See application file for complete search history.

(56) References Cited

U.S. PATENT DOCUMENTS

| | | | |
|---|---|---|---|
| 4,000,220 A | 12/1976 | Shoji et al. | |
| 4,001,349 A | 1/1977 | Severini et al. | |
| 4,170,582 A | 10/1979 | Mori et al. | |
| 4,427,826 A | 1/1984 | Echte et al. | |
| 4,547,327 A | 10/1985 | Bruins et al. | |
| 4,680,352 A | 7/1987 | Janowicz et al. | |
| 4,694,054 A | 9/1987 | Janowicz | |
| 4,808,656 A | 2/1989 | Kania et al. | |
| 5,264,530 A * | 11/1993 | Darmon et al. | 526/194 |
| 6,100,350 A * | 8/2000 | Wilczek et al. | 526/82 |
| 6,872,789 B2 * | 3/2005 | Brinkhuis et al. | 526/89 |
| 6,884,562 B1 * | 4/2005 | Schadt et al. | 430/270.1 |
| 7,022,762 B2 * | 4/2006 | Van Aert et al. | 524/828 |
| 2002/0072580 A1 * | 6/2002 | Aert et al. | 526/319 |

FOREIGN PATENT DOCUMENTS

| WO | 02/094887 | 11/2002 |
|---|---|---|
| WO | 03/076922 | 9/2003 |

OTHER PUBLICATIONS

Jeromin, J., et al. "Cyclodextrins in Polymer Synthesis: Free Radical Polymerization of a N-Metharcryloyl-11-aminoundecanoic Acid/β-Cyclodextrin Pseudorotaxane in an Aqueous Medium." *Macromolecules* (1999) vol. 32, pp. 5236-5239.
Lau, Willie "Emulsion Polymerization of Hydrophobic Monomer." *Macromol. Symp.* (2002) vol. 182, pp. 283-289.
Leyer, R. J., et al. "Emulsion polymerization of hydrophobic monomers like stearyl acrylate with cyclodextrin as a phase transfer agent." *Macromol. Chem. Phys.* (2000) vol. 201, pp. 1235-1243.
Meijs, G .F., et al. "Preparation of Controlled Molecular Weight, Olefin-Terminated Polymers by Free Radical Methods. Chain Transfer Using Allylic Sulfides." *Macromolecules* (1988) vol. 21, pp. 3122-3124.
Kapse, G.W., et al. "Studies on mould resistant emulsion paints." *Paint India* (1983) vol. 33, pp. 5-7.
Watanabe, Y., et al. "Addition-Fragmentation Chain Transfer in Free Radical Styrene Polymerization in the Presence of 2,4-Diphenyl-4-methyl-1-pentene."*Chemistry Letters* (1993) pp. 1089-1092.
Spychaj, T. "Low Molecular Weight Polymers of Acrylic Acid and Copolymers with Styrene." *Progress in Organic Coatings* (1989) vol. 17, pp. 71-88.
Sato, E., et al. "Macromonomer Synthesis Using Oligomers of ω-Unsaturated Methacrylate as Addition-Fragmentation Chain Transfer Agents: Increased Efficiency by Manipulation of Steric Hindrance." *Macromolecules* (2004) vol. 37, pp. 2363-2370.
Storsberg, J., et al. "Cyclodextrins in Polymer Synthesis: Supramolecular Cyclodextrin Complexes of Pyrrole and 3,4-Ethylenedioxythiophene and Their Oxidative Polymeriaation." *Advanced Materials* (1999) vol. 12, 3 pages.
Ohnaga, T., et al. "Synthesis of poly(vinyl acetate) macromonomers and preparation of poly(vinyl acetate) grafted copolymers and poly (vinyl alcohol) grafted copolymers." *Polymer* (1996) 37 (16) 3729 , 7 pages.
Meijs, G. F.,et al. "Use of Substituted Allylic Sulfides to Prepare End-Functional Polymers of Controlled Molecular Weight by Free-Radical Polymerization." *Macromolecules* (1991) vol. 24, pp. 3689-3695.
Meijs, G. F., et al. "The use of activated benzyl vinyl ethers to control molecular weight in free radical polymerizations."*Makromol. Chem.* (1990) vol. 191, pp. 1545-1553.
Baussard, J., et al. "New chain transfer agents for reversible addition-fragmentation chain transfer (RAFT) polymerisation in aqueous solution." *Polymer* (2004) 45, pp. 3615-3626.

(Continued)

*Primary Examiner*—Susan W Berman
(74) *Attorney, Agent, or Firm*—Ladas & Parry LLP

(57) ABSTRACT

This invention provides a water-soluble macromonomer having terminal unsaturation obtained by polymerization of monomers in the presence of inclusion complex of chain transfer agent in aqueous system. Hydrophobic chain transfer agent AMSD forms an inclusion complex with methylated cyclodextrin. The complexation enhances its solubility in water and enables the polymerization of water-soluble monomers in aqueous medium. After polymerization cyclodextrin is removed and the macromer with terminal unsaturation obtained can be used further for copolymerization with any vinyl monomer.

17 Claims, No Drawings

OTHER PUBLICATIONS

Fischer, J.P., et al. "Kinetik der radikalischen Copolymerisation α-substituierter Styrole mit Styrol." *Die Makromolekulare Chemie* (1972) 155, pp. 239-257.

Glockner, P., et al. "Cyclodextrins in polymer chemistry: Influence of methylatedβ-cyclodextrin as host on the free radical copoylmerization reactivity ratios of isobornyl acrylate and butyl acrylate as guest monomers in aqueous medium." *Macromol. Rapid Commun.* (1999) 20, pp. 602-605.

Glockner, P., et al. "Cyclodextrins in polymer synthesis: Free radical polymerization of methylated β-cyclodextrin complexes of methyl methacrylate and styrene, controlled by dodecanethiol as the chain-transfer agent in aqueous medium." *Macromol. Chem. Phys.* (2000) 201, pp. 2455-2457.

Glockner, P., et al. "Cyclodextrins in Polymer Synthesis: Free-Radical Polymerization of Methylated β-Cyclodextrin Complexes of Methyl Methacrylate and Styrene Controlled by N-acetyl-L-cysteine . . . in Aqueous Medium." *Macromolecules* (2000) 33, pp. 4288-4290.

Jeromin, J., et al. "Cyclodextrins in polymer synthesis: free radical polymerisation of cyclodextrin complexes of cyclohexyl and phenyl methacrylate in aqueous medium." *Macromol. Rapid Commun.* (1998) 19, pp. 377-379.

Jeromin, J., et al. "Cyclodextrins in polymer synthesis: Free radical polymerization of cyclodextrin complexes with N-methacryloyl-11-aminoundecanoic acid or N-methacryloyl-1-aminononane as guest monomers." *Macromol. Chem. Phys.* (1998) 199, pp. 2641-2645.

* cited by examiner

WATER-SOLUBLE MACROMONOMERS CONTAINING TERMINAL UNSATURATION AND A PROCESS FOR THE PREPARATION THEREOF

FIELD OF THE INVENTION

This invention relates to water-soluble macromonomer having terminal unsaturation and a process for preparation thereof. More particularly, it relates to the aqueous polymerization of any water-soluble monomer in the presence of chain transfer agent—methylated cyclodextrin complex, which results in water-soluble macromonomers having terminal unsaturation. These macromonomers are obtained by the aqueous polymerization of water-soluble monomer in the presence of water-soluble inclusion complex of the chain transfer agent with cyclodextrin derivative using thermal or photochemical initiators.

Macromonomers with unsaturation as an end group have utility as precursors to block, graft and end-functional polymers and hence wide applications depending on the polymer structure. Changing the chemical structure of the polymer chain can provide macromonomers having various properties, while changing the comonomer can lead to polymers having different properties.

BACKGROUND OF THE INVENTION

The selection of polymers in particular application depends both on the polymer molecular weight and on the molecular weight distribution. Very often it is necessary to control the molecular weight of the polymer so that it may be fitted to its particular use. Polymers having low molecular weight with some functionality referred as macromers have become of increasing interest since they are useful in a variety of applications such as surface-active agents, dispersants, binders and coatings, sequestering and sealing agents. In this respect, water-soluble oligomers and low molecular weight polymers of acrylic acid (AA) of average molecular weight up to 20,000 appear to be especially useful in various applications. A typical application of polyacrylic acid (PAA) is in the thickening of natural rubber latices. The addition of low molecular weight PAA as the sodium salt to 40 wt. % natural rubber as a creaming agent causes separation of the system into two layers, i.e. clear latex serum and concentrated latex containing 60 wt. % rubber. If low molecular weight PAA solution is sprinkled over propylene sheet to which aluminium foil has to be stuck, the resulting Al-PP laminate has a high mechanical strength. The optimum PAA molecular weights for application as dispersing agents in water energy systems lie in the range 1,000-4,000. Poly(acrylic acid) with Mn values in the range 10,000-18,000 may be used for dispersing mineral fillers, inorganic pigments and other minerals in water systems to obtain stable suspensions or slurries suitable for pumping. For example, the separation of kaolin from deposits is best effected by a polymer with Mn in the range 4,000 to 10,000 using AA polymer content in a 0.001-2.0 wt % ratio in relation to the dry mineral. Another field of application for low molecular weight PAA is as a dispersant for the improvement of binding agents such as cement and gypsum in water slurries. It also accelerates concrete setting (quick-setting concretes). Acrylic acid polymers, ranging in molecular weight from the lowest oligomers up to 20,000 may be employed for talc purification (e.g. 0.1-2 wt. % pAA). (Spychaj T., *Progress in Organic Coatings*, 17, 1989, 71)

Low molecular weight Poly(vinyl alcohol) (PVA) has been used for many industrial applications, e.g. paper-coating, fibre-sizing, as a stabilizer in disperse systems, and manufacture of fibre and film. It is often used in the blends of other polymers to improve its solution and bulk properties. Some polymers such as polyvinylpyrorrlidone and cellulose and its derivatives are known to be miscible with PVA in the blend films due to some specific interactions, e.g. hydrogen bonding between PVA and these polymers. However, many other polymer blends containing PVA are known to exhibit macroscopic phase separation. On the other hand, in order to prepare graft copolymers with a well-defined structure, one can use the macromonomer technique. Block and graft copolymers containing the PVA sequence as one component have been used as compatibilizers for the blends to attain fine dispersion, which makes various properties of the blends better. Recently, the free-radical polymerization of VAc with chain transfer agents was applied to the preparation of the block copolymers containing the PVA sequence (Ohnaga T., Sato T., Polymer 37(16), 1996, 3729). Also, the copolymers prepared from macromers have different properties and hence may also open up new areas of usability. AA-St (acrylic acid-styrene) copolymers containing 40 wt % AA and with molecular weights within the range 400-4,000 are used as water-soluble lacquers for paper. Low molecular weight AA-St copolymers provide as excellent basis for the formulation of inks for printing on paper, polymer or metallic foils. (Spychaj T., *Progress in Organic Coatings*, 17, 1989, 71)

Examples of low molecular weight AA-St resin usage in the paint industry include water-proofing sealants for roofs and conductive coatings based on powdered aluminium filler as well as mould-resistant emulsion paints with a high performance (Kapse G. and Aggarwal L., Paint India, 33, 1983, 5).

A characteristic example of the application of St-AA copolymers is in self-polishing floor coatings on linoleum or poly(vinyl chloride) plates. These coating materials are water-soluble in the presence of ammonia, but after drying (and partial ammonia evaporation) become insoluble. Other advantages exhibited by such self-polishing floor coatings are resistance to detergents, abrasion and soiling, and the existence of a high polish over a long time span. The above requirements are best fulfilled by AA-St copolymers in which the comonomer mole ratio is 1:2 and with molecular weights ranging from 500 to 6,000. (Spychaj T., *Progress in Organic Coatings*, 17, 1989, 71)

Using a chain transfer agent in free radical polymerization can reduce the polymer molecular weight by its chain-breaking action. Organic compounds such as mercaptans or alkyl bromides have been widely used in polymerization processes to control polymer molecular weight. U.S. Pat. No. 4,000,220 discloses the use of chain transfer agent such as mercaptans, thiopropionic acid, carbon tetrachloride and dimeric alpha methylstyrene in the production of thermoplastic graft copolymer resins where introduction of small amount of double bonds i.e. AMSD increases the weatherability and hence impact strength of the resin. U.S. Pat. No. 4,001,349 discloses the use of chain transfer agents such as mercaptans for the preparation of grafted products of styrene and saturated polyolefinic elastomers. U.S. Pat. No. 4,427,826 discloses polymerizing 1,3-diene rubber and one or more vinyl monomers, with or without a solvent, in the absence of a free radical initiator and in the presence of a mercaptan chain transfer agent. Macromers with unsaturation can also be obtained using chain transfer agents such as cobalt (II or III) chelates as disclosed in U.S. Pat. No. 4,680,352 and U.S. Pat. No. 4,694,054. The use of terminally ethylenically unsaturated oligomers as chain transfer agents, for controlling the molecular weight of certain polymers is also known. Such oligomers are known, for example, as disclosed in U.S. Pat. No. 4,547,327, U.S. Pat. No. 4,170,582; U.S. Pat. No. 4,808,656.

Free-radical copolymerization of a macromonomer with a vinyl or an acrylic comonomer has been and is still the major field of macromonomers because it provides easy access to graft polymers. Macromonomers bearing unsaturated end groups (e.g., 2-substituted-2-propenyl end groups) that are reactive toward addition of propagating radicals of monomers such as methacrylates, acrylates, and styrene (St) have attracted attention as useful precursors for synthesis of branched or graft polymers by conventional free radical polymerization. Macromonomer synthesis by conventional radical polymerization, and the reactions of these macromonomers, have been widely studied in recent years. The approach has the advantage of its moderate conditions compared to living ionic polymerizations.

Changing the chemical structure of the polymer chain can provide macromonomers having various properties, while changing the comonomer can lead to polymers having different properties. At the same time, macromonomers have some advantages such as non-volatility and high solubility that are different from those of small monomers and polymers, which make it easy to control them in further reaction. So, design and synthesis of macromonomers with various structures is useful in developing new polymeric materials.

The synthesis of macromonomers is mainly by two methods. The first one, called the end-capping agent. The second one, called the initiation method, utilizes an unsaturated initiator to bring about polymerization of monomer to form macromonomer directly. These two methods have been successfully applied in synthesis of macromonomers via anionic, cationic, or group-transfer polymerization. The harsh conditions and limitation in choice of monomer for ionic living polymerization, there are many attempts for preparation of macromonomers by radical polymerization.

Catalytic chain transfer (CCT) polymerization is one of the most effective method to prepare macromonomers in radical polymerization. The polymerization of acrylates and St at high temperature has been also shown to yield macromonomers via formation of midchain radicals followed by fragmentation. However, effective CCT polymerization resulting in carbon-carbon double bonds is restricted to the homopolymerization and copolymerization of R-methylvinyl compounds such as methyl methacrylate (MMA) and R-methylstyrene, (Sato E., Zetterlund P. and Yamada B., Macromolecules, 37, 2004, 2363).

Although a prominent advantage of free radical polymerization is the tolerance to electrophilic and nucleophilic compounds, in particular to the presence of water, controlled free radical polymerization studies in aqueous solution are minority. This is due to the need of modifying the necessary additives to give water-solubility to them. And also this is due to the high temperatures of above 100° C., as often needed for nitroxide mediated polymerization (NMP), or to the sensitivity of the 'controlling agents' to the presence of water, as for many atom transfer radical polymerization (ATRP) catalysts. In this context, the use of the reversible addition fragmentation transfer (RAFT) method appears particularly appealing for aqueous polymerization systems. Still, the number of reports on the use of the RAFT method in aqueous systems is limited. However, the commonly used classes of dithioester and trithiocarbonate compounds are known to be sensitive to hydrolysis. (Baussard J., Habib—Jiwan J., Laschewsky A., Mertoglu M., Storsberg J., Polymer 45, 2004, 3615

In conventional radical polymerization, the macromonomer precursor method is very useful; the macromonomer precursor was synthesized at first by using an appropriate transfer agent such as thioglycolic acid, then the unsaturation was introduced by the reaction. But, use of this method requires two steps. Hence, there is a need to obtain unsaturated macromers, which can be used directly for copolymerization with any vinyl monomer.

Meijs et. al. (Meijs G., Rizzardo E. and Thang S., Macromolecules, 21, 1988, 3122, Meijs G. and Rizzardo E., Makromol. Chem., 191, 1990, 1545, Meijs G., Morton T., Rizzardo E., and Thang S., Macromolecules, 24, 1991, 3689) have reported that allylic compounds activated by phenyl, alkoxy carbonyl and cyano groups undergo chain transfer via sequential radical addition and fragmentation reactions which gives polymer with terminal double bond.

2,4-diphenyl-4-methyl-1-pentene, i.e., α-methylstyrene dimer (α-MSD), is also known to be an effective chain transfer agent for styrene polymerization. S. Suyama et al has reported the addition—fragmentation chain transfer in free radical styrene polymerization in the presence of 2,4-diphenyl-4-methyl-1-pentene. They have proposed, a chain transfer mechanism through addition—fragmentation reaction. (Watanabe Y., Ishigaki H., Okada H. and Suyama S., Chemistry letters, 1993, 1089) That is, polymer radical adds to the terminal double bond of α-MSD and then the adduct radical undergoes fragmentation to give a cumyl radical and a polymer with a terminal double bond. This is because cumyl radical being tertiary radical is more stable than polymer radical being a secondary radical. The report on the use of AMSD as a chain transfer agent for hydrophobic monomers such as methyl methacrylate, styrene is known. It also tells that the use of AMSD in free radical polymerization gives the functionality to the polymers in terms of terminal unsaturation.

Fischer and Luders (Fischer J. and Luders W., Makromol. Chem., 155, 1972, 239,) have proposed that the chain transfer would proceed through allylic hydrogen abstraction by polymer radical and/or addition of polymer radical to α-MSD and subsequent hydrogen atom transfer to styrene. Being α-MSD very hydrophobic in nature not applicable in aqueous polymerization systems. There are numerous applications of water-soluble oligomers having terminal unsaturation.

The use of equimolar amounts of cyclodextrins to dissolve suitable hydrophobic monomers in water and the free radical polymerization of such host/guest complexes has recently been investigated by Ritter et. Al. (Jeromin J., Noll O., Ritter H., Macromol. Chem. Phys. 199, 1998, 2641, Jeromin J., Ritter H., Macromol. Rapid Commun. 19, 1998, 377, Jeromin J., Ritter H., Macromolecules 32, 1999, 5236, Glockner P., Ritter H., Macromol. Rapid Commun., 20, 1999, 602, Glockner P., Metz N., Ritter H., Macromolecules 33, 2000, 4288, Ritter H., Storsberg J., Pielartzik H., Groenendaal L., Adv. Mater. 12, 2000, 567).

The use of a catalytic level of cyclodextrin allows the use of very hydrophobic monomers in emulsion polymerization where cyclodextrin acts as a phase transport catalyst continuously complexing and solubilizing the hydrophobic monomers and releasing them to the polymer particles. (Lau W., Macromol. Symp. 182, 2000, 283-289, Leyrer R., Machtle W., Macromol. Chem. Phy., 201, 2000, 1235-1243)

The chain transfer constants for 1:1 host-guest complexes of methyl methacrylate-me-β-CD and styrene-me-β-CD were determined using water soluble dodecanethiol-me-β-CD complex. The chain transfer constant of this complexed system was found to be lower when compared with the uncomplexed system. (Glockner P., Ritter H., Macromol. Chem. Phy., 201, 2000, 2455-2457).

Investigation on free radical polymerization of CD complexed monomers in the presence of N-acetyl-L-cysteine as hydrophilic chain transfer agent in aqueous medium is reported by Ritter et. Al. Relatively high chain transfer constants of N-acetyl-L-cysteine were found in the case of the complexed methyl methacrylate and styrene monomers in water. (Glockner P., Metz N., Ritter H., Macromolecules, 33, 2000, 4288).

Up to now only two reports on chain transfer activity of mercaptans on the degree of polymerization of CD—complexed monomers has been evaluated. But, in these reports, only the effect of steric hindrance on the chain transfer activity of the chain transfer agents was investigated.

α-methyl styrene dimer in organic medium has been effectively used as a chain transfer agent as reported in the literature. But, there is no report on the use of AMSD as a chain transfer agent in aqueous medium. The survey of the prior art in the field of utilization of chain transfer agent reveals that the use of AMSD-DM-β-CD complex for water soluble monomers in aqueous system giving water soluble macromers having terminal unsaturation has not been reported till date. The terminal unsaturation obtained using AMSD-DM-β-CD complex has a reasonable reactivity in copolymerization. It has been found that AMSD forms an inclusion complex with DM-β-CD and becomes water-soluble and hence can be applied as a water-soluble chain transfer agent. Further, the chain transfer activity of the agent is not reduced and also it incorporates unsaturation as a terminal functionality. This property is used for the polymerization of various water-soluble monomers, which gives water-soluble macromers having unsaturation as an end-functionality. The terminal unsaturation can be used further for crosslinking or grafting of any comonomer depending on the particular application.

OBJECTS OF THE INVENTION

The main object of the present invention is to provide water-soluble macromers having terminal unsaturation.

Yet another object is to provide a process of polymerization to obtain water-soluble macromers having terminal unsaturation by employing a methyl styrene dimer as a chain transfer agent.

Still another object is to control the molecular weight of the macromer so produced.

SUMMARY OF THE INVENTION

This invention describes a method for synthesis of water-soluble macromers containing terminal unsaturation. The chain transfer agent used to obtain water-soluble macromers with terminal unsaturation is exemplified by a methyl styrene dimer-dimethylated β-CD complex (AMSD-DM-β-CD). AMSD forms water-soluble inclusion complex with DM-β-CD. This complex was further used for the homopolymerization of different hydrophilic monomers in aqueous medium to obtain the polymers with terminal unsaturation. After polymerization cyclodextrin is removed and the macromer obtained can be used further for copolymerization with any vinyl monomer.

The vinyl monomers which can be used in the synthesis of these macromers, are exemplified by acrylamide, methacrylic acid, N-vinyl pyrrolidone, 2-dimethyl aminoethyl methacrylate, 2-acrylamido 2-methyl propane sulphonic acid and sodium styrene sulphonic acid. The polymerization reactions are carried out in aqueous medium rather than in organic polar solvents. Thus, the present invention describes a method of preparing water-soluble macromers containing terminal unsaturation. The polymerization can also be carried out in organic solvents like N,N' dimethyl formamide, dimethyl sulphoxide or aqueous medium using either oil/water soluble initiators.

DETAILED DESCRIPTION OF THE INVENTION

Accordingly, the present invention provides a water soluble macromonomer having formula, (Ax)B wherein 'A' is any water-soluble vinyl monomer; 'x' is the degree of polymerization and 'B' is alpha-methyl styrene dimmer (AMSD) at the chain end.

In an embodiment of the present invention the degree of polymerization of the macromonomer is in the range of 5-100.

In yet another embodiment the hydrophilic monomer containing vinyl unsaturation used is acidic, basic or neutral.

In yet another embodiment the water-soluble acidic monomer containing vinyl unsaturation used is selected from the group consisting of acrylic acid, methacrylic acid, 2-acrylamido 2-methyl propane sulphonic acid and 4-styrene sulphonic acid.

In yet another embodiment the water-soluble acidic monomer containing vinyl unsaturation used is preferably selected from methacrylic acid and 2-acrylamido 2-methyl propane sulphonic acid.

In yet another embodiment the water-soluble basic monomer containing vinyl unsaturation used is selected from 2-dimethyl aminoethyl methacrylate and 2-diethyl aminoethyl methacrylate.

In yet another embodiment the water-soluble basic monomer used is preferably 2-dimethyl aminoethyl methacrylate.

In yet another embodiment the water-soluble neutral monomer containing vinyl unsaturation used is selected from the group consisting of acrylamide, N,N' dimethyl acrylamide, t-butyl acrylamide and N-vinyl pyrrolidone.

In yet another embodiment the water-soluble neutral monomer used is preferably selected from acrylamide and N-vinyl pyrrolidone.

The present invention further provides a process for the preparation of a water soluble macromonomer having formula, (Ax)B wherein 'A' is any water-soluble vinyl monomer; 'x' is the degree of polymerization and 'B' is alpha-methyl styrene dimmer (AMSD) at the chain end and the said process comprising the steps of:
  a) dissolving equimolar quantities of chain transfer agent, alpha-methyl styrene dimmer (AMSD) and a complexing agent, dimethylated beta cyclodextrin (DM-β-CD), in an organic solvent, under stirring for about 24 hrs, concentrating the above said reaction mixture to dryness and washing with the solvent to remove the unreacted chain transfer agent (AMSD), followed by drying to obtain AMSD-DM-β-CD complex,
  b) dissolving the above said AMSD-DM-β-CD complex and a water soluble vinyl monomer in aqueous medium in the presence of a radical initiator, and polymerizing it by solution polymerization method, at a temperature in the range of 20-70° C., precipitating and re-precipitating the resultant polymer free from complexing agent (DM-β-CD) by using non solvent, followed by filtration and drying to obtain the desired purified macromonomer.

In yet another embodiment the organic solvent used in step (a) for the preparation of complex is selected from methanol, chloroform and tetrahydrofuran.

In yet another embodiment the ratio of AMSD to DMCD in the AMSD-DM-β-CD complex obtained is about 1:1.

In yet another embodiment the radical initiator used in step (b) for polymerization is thermal, redox or photoinitiators.

In yet another embodiment the thermal initiator used for polymerization is selected from the group consisting of potassium persulphate, ammonium persulphate, azo bis cyano valeric acid and 2,2' azo bis amidinopropane dihydrochloride.

In yet another embodiment the thermal initiator used for polymerization is preferably selected from potassium persulphate and 2,2' azo bis amidinopropane dihydrochloride.

In yet another embodiment the redox initiator used for polymerization is selected from sodium metabisulphite-potassium persulphate and sodium sulphite-potassium persulphate.

In still another embodiment the photoinitiator used for polymerization is preferably 2,2' azo bis amidinopropane dihydrochloride.

The following examples are given by the way of illustration and therefore should not be construed to limit he scope of the invention.

Example 1

Synthesis of AMSD-DM-β-CD Complex in Chloroform 28.2 g (0.0212 moles) DM-β-CD was dissolved in 564 ml chloroform at room temperature. To this, 5 g (0.0212 moles) α-methyl styrene dimer was added in one portion and the mixture was stirred using a magnetic stirrer for 24 hrs. A chloroform complex was obtained. Chloroform was evaporated at room temperature. The complex was dried in a desiccator under vacuum. The yield was 95%. The complex was characterized by 200 MHz $^1$H NMR and IR spectroscopy.

The stoichiometry of the complex was determined from the area of the protons for DM-β-CD and α-methyl styrene dimer and found to be 1:1. IR spectrometric analysis indicated the presence of unsaturation and aromaticity in the complex due to AMSD.

Example 2

Synthesis of AMSD-DM-β-CD Complex in Tetrahydrofuran 5.6414 g (0.0042 moles) DM-β-CD was dissolved in 113 ml tetrahydrofuran at room temperature. To this, 1 g (0.0042 moles) α-methyl styrene dimer was added in one portion and the mixture was stirred using a magnetic stirrer for 24 hrs. A tetrahydrofuran soluble complex was obtained. The solvent was evaporated at room temperature. The complex was dried in a desiccator under vacuum. The yield was 95%. The complex was characterized by 200 MHz $^1$H NMR and IR spectroscopy.

The stoichiometry of the complex was determined from the area of the protons for DM-β-CD and α-methyl styrene dimer and found to be 1:1. IR spectrometric analysis indicated the presence of unsaturation and aromaticity in the complex due to AMSD.

Example 3

Synthesis of AMSD-DM-β-CD Complex in Methanol 5.6414 g (0.0042 moles) DM-β-CD was dissolved in 113 ml methanol at room temperature. To this, 1 g (0.0042 moles) α-methyl styrene dimer was added in one portion and the mixture was stirred using a magnetic stirrer for 24 hrs. A methanol soluble complex was obtained. The solvent was evaporated at room temperature. The complex was dried in a desiccator under vacuum. The yield was 95%. The complex was characterized by 200 MHz $^1$H NMR and IR spectroscopy.

The stoichiometry of the complex was determined from the area of the protons for DM-β-CD and α-methyl styrene dimer and found to be 1:1. IR spectrometric analysis indicated the presence of unsaturation and aromaticity in the complex due to AMSD.

FTIR (chloroform): 702 cm$^{-1}$ monosubstituted benzene of AMSD, 1494, 1600 cm$^{-1}$ benzene ring of AMSD, 1624 cm$^{-1}$ vinyl group of AMSD, 1215 cm$^{-1}$ —OCH$_3$ of DMCD, 3408 cm$^{-1}$ —OH of DMCD.

$^1$H NMR (CDCl$_3$): 4.78 δ, 5.15 δ C=CH$_2$ of AMSD, 7.2-7.4 δ phenyl ring of AMSD, 3.39-3.41 & 3.57-3.856 cyclodextrin peak. The complex obtained was used for the synthesis of the following water-soluble macromers.

Example 4

This example provides the preparation of p(methacrylic acid) i.e. p(MA) in the presence of Alpha methyl styrene dimer-dimethylated β-Cyclodextrin complex (AMSD-DM-β-CD-complex)

1 g (0.0116 mole) methacrylic acid, 0.010 g potassium persulphate (10 wt % based on monomer) and 0.7292 g AMSD-DM-β-CD, complex (Monomer:complex mole ratio 25:1) were dissolved in 10 ml of distilled water in a test tube. The reaction mixture was purged with nitrogen gas and polymerization was carried out at 65° C. for 6 hours. The resultant solution was concentrated to dryness using rota-vapour and washed with acetone and pet ether to remove DM-β-CD and unreacted monomer. The polymer was characterized by aqueous GPC to determine its molecular weight.

Mn=39,441

Unsaturation content=4.76 mole %

FTIR (chloroform): 702 cm$^{-1}$ monosubstituted benzene of AMSD, 1494, 1600 cm$^{-1}$ benzene ring of AMSD, 1624 cm$^{-1}$ vinyl group of AMSD, 2900-3200OH of MA, 1710 cm$^{-1}$ C=O of MA.

$^{13}$C(CDCl$_3$): 183.45 δ C=O of methacrylic acid, 114 δ, 124 δ C=C of AMSD. The polymerization was carried out using different ratios of monomer and AMSD-DM-β-CD complex as shown in Table 1.

Example 5

This example provides the preparation of p(acrylamide) i.e. p(AM) in the presence of AMSD-DM-β-CD complex 1 g (0.0141 mole) acrylamide, 0.010 g potassium persulphate (10 wt % based on monomer) and 0.8826 g AMSD-DM-β-CD complex (Monomer:complex mole ratio 25:1) were dissolved in 10 ml of distilled water in a test tube. The reaction mixture was purged with nitrogen gas and polymerization was carried out at 65° C. for 6 hours. The resultant solution was concentrated to dryness using rota-vapour and washed with acetone and pet ether to remove DM-β-CD and unreacted monomer. The polymer was characterized by aqueous GPC to determine its molecular weight.

Mn=4,625

Unsaturation content=2.78 mole %

FTIR (chloroform): 702 cm$^{-1}$ monosubstituted benzene of AMSD, 1494, 1600 cm$^{-1}$ benzene ring of AMSD, 1624 cm$^{-1}$ vinyl group of AMSD, 3100 cm$^{-1}$, 1640 cm$^{-1}$ of AM.

$^1$H NMR (CDCl$_3$): 4.78 δ, 5.15 δ C=CH$_2$ of AMSD, 7.2-7.4 δ phenyl ring of AMSD.

The polymerization was carried out using different ratios of monomer and AMSD-DM-β-CD complex as shown in Table 2.

Example 6

This example provides the preparation of p(acrylamide) i.e. p(AM) in the presence of AMSD-DM-β-CD complex having reaction time 2 hrs. 1 g (0.0141 mole) acrylamide, 0.010 g potassium persulphate (10 wt % based on monomer) and 0.2207 g AMSD-DM-β-CD complex (Monomer:complex mole ratio 100:1) were dissolved in 10 ml of distilled water in a test tube. The reaction mixture was purged with nitrogen gas and polymerization was carried out at 65° C. for 2 hours. The resultant solution was concentrated to dryness using rota-vapour and washed with acetone and pet ether to remove DM-β-CD and unreacted monomer. The polymer was characterized by aqueous GPC to determine its molecular weight.

Mn=8,272.

Unsaturation content=1.45 mole %.

FTIR (chloroform): 702 cm$^{-1}$ monosubstituted benzene of AMSD, 1494, 1600 cm$^{-1}$ benzene ring of AMSD, 1624 cm$^{-1}$ vinyl group of AMSD, 3100 cm$^{-1}$, 1640 cm$^{-1}$ of AM.

$^1$H NMR (CDCl$_3$): 4.78 δ, 5.15 δ C=CH$_2$ of AMSD, 7.2-7.4 δ phenyl ring of AMSD.

Example 7

This example provides the preparation of p(acrylamide) i.e. p(AM) in the presence of AMSD-DM-β-CD complex having reaction time 3 hrs.

1 g (0.0141 mole) acrylamide, 0.010 g potassium persulphate (10 wt % based on monomer) and 0.2207 g AMSD-DM-β-CD complex (Monomer:complex mole ratio 100:1) were dissolved in 10 ml of distilled water in a test tube. The reaction mixture was purged with nitrogen gas and polymerization was carried out at 65° C. for 3 hours. The resultant solution was concentrated to dryness using rota-vapour and washed with acetone and pet ether to remove DM-β-CD and unreacted monomer. The polymer was characterized by aqueous GPC to determine its molecular weight.

Mn=10,851.

Unsaturation content=1.35 mole %.

FTIR (chloroform): 702 cm$^{-1}$ monosubstituted benzene of AMSD, 1494, 1600 cm$^{-1}$ benzene ring of AMSD, 1624 cm$^{-1}$ vinyl group of AMSD, 3100 cm$^{-1}$, 1640 cm$^{-1}$ 1 of AM.

$^1$H NMR (CDCl$_3$): 4.78 δ, 5.15 δ C=CH$_2$ of AMSD, 7.2-7.4 δ phenyl ring of AMSD.

Example 8

This example provides the preparation of p(N-vinyl pyrrolidone) i.e. p(NVP) in the presence of AMSD-DM-β-CD complex 1 g (0.009 mole) N-vinyl pyrrolidone, 0.010 g 2,2' azo bis amidinopropane dihydrochloride (10 wt % based on monomer) and 0.1129 g of AMSD-DM-β-CD complex (Monomer:complex mole ratio 125:1) were dissolved in 10 ml of distilled water in a test tube. The reaction mixture was purged with nitrogen gas and polymerization was carried out at 65° C. for 6 hours. The resultant solution was concentrated to dryness using rota-vapour and washed with tetrahydrofuran and pet ether to remove DM-β-CD and unreacted monomer. The polymer was characterized by aqueous GPC to determine its molecular weight.

Mn=4,404

Unsaturation content=0.85 mole %

FTIR (chloroform): 702 cm$^{-1}$ monosubstituted benzene of AMSD, 1494, 1600 cm$^{-1}$ benzene ring of AMSD, 1624 cm$^{-1}$ vinyl group of AMSD, 1710 cm$^{-1}$ C=O of NVP.

$^1$H NMR (CDCl$_3$): 4.78 δ, 5.15 δ C=CH$_2$ of AMSD, 7.2-7.4 δ phenyl ring of AMSD, 2.1-2.2 δ, 2.5δ, 3.5δ CH$_2$ of NVP.

The polymerization was carried out using different ratios of monomer and AMSD-DM-β-CD complex as shown in Table 3.

Comparative Example 9

This example provides the preparation of p(N-vinyl pyrrolidone) i.e. p(NVP) in the absence of AMSD-DM-β-CD complex i.e. directly AMSD was used 1 g (0.009 mole) N-vinyl pyrrolidone, 0.010 g 2,2' azo bis amidinopropane dihydrochloride (10 wt % based on monomer) and 0.0142 g of AMSD (Monomer AMSD mole ratio 150:1) were added in 10 ml of distilled water in a test tube. The reaction mixture was purged with nitrogen gas and polymerization was carried out at 65° C. for 6 hours. The resultant solution was concentrated to dryness using rota-vapour and washed with pet ether to remove unreacted monomer. The polymer was characterized by aqueous GPC to determine its molecular weight.

Mn=78,700.

FTIR (chloroform): 1710 cm$^{-1}$ C=O of NVP.

$^1$H NMR (CDCl$_3$): 2.1-2.2 δ, 2.5δ, 3.5δ CH$_2$ of NVP.

Example 10

This example provides the preparation of p(Na salt of 2-acrylamido 2-methyl propane sulphonic acid) i.e. p(NaAMPS) in the presence of AMSD-DM-β-CD complex 1 g (0.0039 mole) Na salt of 2-acrylamido 2-methyl propane sulphonic acid, 0.010 g 2,2' azo bis amidinopropane dihydrochloride (10 wt % based on monomer) and 0.2497 g AMSD-DM-β-CD complex (Monomer:complex mole ratio 25:1) were dissolved in 10 ml of distilled water in a test tube. The reaction mixture was purged with nitrogen and polymerization was carried out at 65° C. for 6 hours. The resultant solution was concentrated to dryness using rota-vapour and washed with acetone and pet ether to remove DM-β-CD and unreacted monomer. The polymer was characterized by aqueous GPC to determine its molecular weight.

Mn=21,110.

Unsaturation content=2.9 mole %.

FTIR (chloroform): 702 cm$^{-1}$ monosubstituted benzene of AMSD, 1494, 1600 cm$^{-1}$ benzene ring of AMSD, 1624 cm$^{-1}$ vinyl group of AMSD, 1350 cm$^{-1}$ S=O of AMPS, 3000 cm$^{-1}$ OH of AMPS.

$^1$H NMR (CDCl$_3$): 4.78 δ, 5.15 δ C=CH$_2$ of AMSD, 7.2-7.4 δ phenyl ring of AMSD, 1.51δ CH$_3$ of AMPS, 3.35 δ SO$_3$H of AMPS.

The polymerization was carried out using different mole ratios of monomer to AMSD-DM-β-CD complex as shown in Table 4.

Example 11

This example provides the preparation of p(2 dimethyl amino ethyl methacrylate) i.e. p(DMAEMA) in the presence of AMSD-DM-β-CD complex 1 g (0.0063 mole) DMAEMA, 0.010 g potassium persulphate (10 wt % based on monomer) and 0.3991 g corresponding amount of AMSD-DM-β-CD complex (Monomer:complex mole ratio 25:1) were dissolved in 10 ml of distilled water a in test tube. The reaction mixture was purged with nitrogen gas and polymerization was carried out at 65° C. for 6 hours. The resultant solution was concentrated to dryness using rota-vapour and washed with pet ether to remove unreacted monomer. The polymer was characterized by aqueous GPC to determine its molecular weight.

Mn=927

Unsaturation content=28.57%

FTIR (chloroform): 702 cm$^{-1}$ monosubstituted benzene of AMSD, 1494, 1600 cm$^{-1}$ benzene ring of AMSD, 1624 cm$^{-1}$ vinyl group of AMSD, 1720 cm$^{-1}$ C=O of DMAEMA.

$^1$H NMR (CDCl$_3$): 4.78 δ, 5.15 δ C=CH$_2$ of AMSD, 7.2-7.4 δ phenyl ring of AMSD, 2.3, 2.65, 4.3δ of DMAEMA.

The polymerization was carried out using different mole ratios of monomer to AMSD-DM-β-CD complex as shown in Table 5.

Example 12

This example provides the preparation of p(Na salt of sodium styrene sulphonic acid) i.e. p(NaSSA) in the presence of AMSD-DM-β-CD complex 1 g (0.0048 mole) Na salt of sodium styrene sulphonic acid, 0.010 g 2,2' azo bis amidinopropane hydrochloride (10 wt % based on monomer) and 0.1520 g AMSD-DM-β-CD complex (Monomer:complex mole ratio 50:1) were dissolved in 10 ml of distilled water in a test tube. The reaction mixture was purged with nitrogen gas and polymerization was carried out at 65° C. for 6 hours. The resultant solution was concentrated to dryness using rota-vapour and washed with acetone and pet ether to remove DM-β-CD and unreacted monomer. The polymer was characterized by aqueous GPC to determine its molecular weight.

$M_n$=1054.

Unsaturation content=1 mole %.

FTIR (chloroform): 702 cm$^{-1}$ monosubstituted benzene of AMSD, 1494, 1600 cm$^{-1}$ benzene ring of AMSD, 1624 cm$^{-1}$ vinyl group of AMSD, 3000 cm$^{-1}$ OH of NaSSA, 1350 cm$^{-1}$ S=O of NaSSA.

$^1$H NMR (CDCl$_3$): 4.78 δ, 5.15 δ C=CH$_2$ of AMSD, 7.2-7.4 δ phenyl ring of AMSD, 7.15-7.3 δ phenyl ring of NaSSA.

Example 13

This example provides the preparation of p(methacrylic acid) in the presence of AMSD-DM-β-CD complex using photopolymerization.

1 g (0.0116 mole) methacrylic acid, 0.1215 g AMSD-DM-β-CD complex (Monomer:complex mole ratio 150:1) and 0.010 g 2,2' azo bis isobutyramidine hydrochloride were dissolved in 10 ml of distilled water in a test tube. The reaction mixture was purged with nitrogen and the solution was poured in a petri dish & kept under UV lamp for photopolymerization for 15 min. The resultant viscous solution was then precipitated in acetone to remove DM-β-CD and unreacted monomer. The polymer was characterized by aqueous GPC to determine its molecular weight.

Mn=1,35,565.

Unsaturation content=0.55 mole %.

FTIR (chloroform): 702 cm$^{-1}$ monosubstituted benzene of AMSD, 1494, 1600 cm$^{-1}$ benzene ring of AMSD, 1624 cm$^{-1}$ vinyl group of AMSD, 2900-3200 OH of MA, 1710 cm$^{-1}$ C=O of MA.

$^1$H NMR (CDCl$_3$): 4.78 δ, 5.15 δ C=CH$_2$ of AMSD, 7.2-7.4 δ phenyl ring of AMSD.

Example 14

This example provides the preparation of p(acrylamide) in the presence of AMSD-DM-β-CD complex using redox initiator system.

1 g (0.0141 mole) acrylamide and 0.0175 g potassium persulphate, 0.01235 g sodium metabisulphite and 0.2207 g AMSD-DM-β-CD complex (Monomer:complex mole ratio 100:1) were dissolved in 10 ml of distilled water in a test tube. The reaction mixture was purged with nitrogen gas and polymerization was carried out at 30° C. for 5 hours. The resultant solution was precipitated in acetone to remove DM-β-CD and unreacted monomer. The polymer was characterized by aqueous GPC to determine its molecular weight. Mn=6,120.

Unsaturation content=1.23 mole %

FTIR (chloroform): 702 cm$^{-1}$ monosubstituted benzene of AMSD, 1494, 1600 cm$^{-1}$ benzene ring of AMSD, 1624 cm$^{-1}$ vinyl group of AMSD, 3100 cm$^{-1}$, 1640 cm$^{-1}$ of AM.

$^1$H NMR (CDCl$_3$): 4.78 δ, 5.15 δ C=CH$_2$ of AMSD, 7.2-7.4 δ phenyl ring of AMSD.

Example 15

This example provides the preparation of p(acrylamide) i.e. p(AM) in the presence of AMSD-DM-β-CD complex at 50° C. using azo bis isobutyramidine hydrochloride initiator.

1 g (0.0141 mole) acrylamide, 0.010 g azo bis isobutyramidine hydrochloride initiator (10 wt % based on monomer) and 0.4409 g AMSD-DM-β-CD complex (Monomer:complex mole ratio 50:1) were dissolved in 10 ml of distilled water in a test tube. The reaction mixture was purged with nitrogen gas and polymerization was carried out at 65° C. for 6 hours. The resultant solution was concentrated to dryness using rota-vapour and washed with acetone and pet ether to remove DM-β-CD and unreacted monomer. The polymer was characterized by aqueous GPC to determine its molecular weight.

Mn=5,540.

Unsaturation content=1.95 mole %.

FTIR (chloroform): 702 cm$^{-1}$ monosubstituted benzene of AMSD, 1494, 1600 cm$^{-1}$ benzene ring of AMSD, 1624 cm$^{-1}$ vinyl group of AMSD, 3100 cm$^{-1}$, 1640 cm$^{-1}$ amide group of AM.

$^1$H NMR (CDCl$_3$): 4.78 δ; 5.15 δ C=CH$_2$ of AMSD, 7.2-7.4 δ phenyl ring of AMSD.

TABLE 1

Polymerization of methacrylic acid in the presence of AMSD - DM - β - CD complex

| Sr. No. | MA:AMSD - DM - β - CD complex (Mole ratio) | MA g | AMSD - DM - β - CD complex g | Mn | PD | Unsaturation content $^1$H mole % |
|---|---|---|---|---|---|---|
| 1. | 50:1 | 1 | 0.3646 | 50,612 | 4.01 | 4.40 |
| 2. | 75:1 | 1 | 0.2431 | 51,213 | 4.04 | 3.75 |
| 3. | 100:1 | 1 | 0.1820 | 51,320 | 4.04 | 2.10 |
| 4. | 125:1 | 1 | 0.1458 | 55,632 | 2.80 | 1.20 |
| 5. | 150:1 | 1 | 0.1215 | 1,20,678 | 4.32 | 0.45 |

TABLE 2

Polymerization of acrylamide in the presence of AMSD - DM - β - CD complex

| Sr. No. | AM:AMSD - DM - β - CD complex (Mole ratio) | AM g | AMSD- DM - β - CD complex g | Mn | PD | Unsaturation content $^1$H Mole % |
|---|---|---|---|---|---|---|
| 1. | 50:1 | 1 | 0.1992 | 5,383 | 6.90 | 2.23 |
| 2. | 75:1 | 1 | 0.1328 | 5,614 | 6.20 | 1.90 |
| 3. | 100:1 | 1 | 0.0996 | 5,869 | 6.30 | 1.55 |
| 4. | 125:1 | 1 | 0.0797 | 8,056 | 5.40 | 1.10 |
| 5. | 150:1 | 1 | 0.0664 | 36,277 | 5.20 | 0.75 |

TABLE 3

Polymerization of N vinyl pyrrolidone in the presence of AMSD - DM - β - CD complex

| Sr. No. | NVP:AMSD - DM - β - CD complex (Mole ratio) | NVP g | AMSD- DM - β - CD complex g | Mn | PD | Unsaturation content $^1$H Mole % |
|---|---|---|---|---|---|---|
| 1. | 50:1 | 1 | 0.2824 | 5,769 | 7.26 | 1.75 |
| 2. | 75:1 | 1 | 0.1879 | 6,190 | 8.60 | 1.35 |
| 3. | 100:1 | 1 | 0.1412 | 5,658 | 7.50 | 1.17 |
| 4. | 125:1 | 1 | 0.1129 | 5,338 | 7.78 | 0.85 |

TABLE 4

Polymerization of Na - acrylamido methyl propane sulphonic acid in the presence of AMSD - DM - β - CD complex

| Sr. No. | NaAMPS:AMSD - DM - β - CD (Mole ratio) | NaAMPS g | AMSD- DM - β - CD complex g | Mn | PD | Unsaturation content $^1$H Mole % |
|---|---|---|---|---|---|---|
| 1. | 50:1 | 1 | 0.1248 | 23,608 | 3.74 | 2.38 |
| 2. | 75:1 | 1 | 0.0832 | 23,825 | 4.34 | 2.15 |
| 3. | 100:1 | 1 | 0.0624 | 24,913 | 4.56 | 1.80 |
| 4. | 125:1 | 1 | 0.0498 | 25,473 | 4.70 | 1.47 |
| 5. | 150:1 | 1 | 0.0416 | 26,108 | 4.70 | 1.10 |

TABLE 5

Polymerization of 2 dimethyl amino ethyl methacrylate in the presence of AMSD - DM - β - CD complex

| Sr. No. | DMAEMA:AMSD - DM - β - CD complex (Mole ratio) | DMAEMA g | AMSD- DM - β - CD complex g | Mn | PD | Unsaturation content $^1$H Mole % |
|---|---|---|---|---|---|---|
| 1. | 50:1 | 1 | 0.1992 | 989 | 1.09 | 25.51 |
| 2. | 75:1 | 1 | 0.1328 | 1143 | 1.2 | 18.03 |

Advantages of the Present Invention are:
1. Though AMSD is hydrophobic in nature, inclusion complex of AMSD with methylated cyclodextrin can be used as a chain transfer agent in aqueous system.
2. AMSD-DM-β-CD complex effectively controls the molecular weight of the polymer and also imparts terminal functionality to the polymer.
3. The unsaturated macromers have the reasonable reactivity and can be used further for copolymerization.

The invention claimed is:

1. A water soluble macromonomer having formula, (Ax)B wherein A is any water-soluble vinyl monomer; x is the degree of polymerization and B is alpha-methyl styrene dimer (AMSD) at the chain end.

2. The water soluble macromonomer of claim 1 wherein the degree of polymerization of the macromonomer according to claim 1 is in the range of 5-100.

3. A macromonomer according to claim 1, wherein the water soluble vinyl monomer is acidic, basic or neutral.

4. A macromonomer according to claim 1, wherein water-soluble vinyl monomer is acidic and is selected from the group consisting of acrylic acid, methacrylic acid, 2-acrylamido 2-methyl propane sulphonic acid and 4-styrene sulphonic acid.

5. A macromonomer according to claim 1, wherein the water-soluble vinyl monomer is methacrylic acid or 2-acrylamido 2-methyl propane sulphonic acid.

6. A macromonomer according to claim 1, wherein water-soluble vinyl monomer is basic and is selected from 2-dimethyl aminoethyl methacrylate and 2-diethyl aminoethyl methacrylate.

7. A macromonomer according to claim 1, wherein the water-soluble vinyl monomer is basic and is 2-dimethyl aminoethyl methacrylate.

8. A macromonomer according to claim 1, wherein water-soluble vinyl monomer is neutral and is selected from acrylamide, N,N' dimethyl acrylamide, t-butyl acrylamide and N-vinyl pyrrolidone.

9. A macromonomer according to claim 1, wherein the water-soluble vinyl monomer is neutral and is selected from acrylamide or N-vinyl pyrrolidone.

10. A process for the preparation of a water soluble macromonomer having formula, (Ax)B wherein A is any water-soluble vinyl monomer; x is the degree of polymerization and B is alpha-methyl styrene dimer (AMSD) at the chain end and the process comprises the steps of:
a) dissolving equimolar quantities of chain transfer agent, alpha-methyl styrene dimer (AMSD) and a complexing agent, dimethylated beta cyclodextrin (DM-β-CD), in an organic solvent, under stirring for about 24 hrs, concentrating the above said reaction mixture to dryness and washing with the solvent to remove the unreacted chain transfer agent (AMSD), followed by drying to obtain AMSD-DM-β-CD complex,
b) dissolving the above said AMSD-DM-β-CD complex and a water soluble vinyl monomer in aqueous medium in the presence of a radical initiator, and polymerizing it by solution polymerization method, at a temperature in the range of 20-70° C., precipitating and re-precipitating the resultant polymer until the polymer is free from complexing agent (DM-β-CD) by using non solvent, followed by filtration and drying to obtain the desired purified macromonomer.

11. A process according to claim 10, wherein the organic solvent used in step (a) for the preparation of complex is selected from the group consisting of methanol, chloroform and tetrahydrofuran.

12. A process according to claim 10, wherein the ratio of AMSD to DMCD in the AMSC-DM-β-CD complex obtained is about 1:1.

13. A process according to claim 10, wherein the radical initiator for polymerization in step (b) is a thermal initiator, a redox initiator or a photoinitiator.

14. A process according to claim 10, wherein the radical initiator is a thermal initiator selected from the group consisting of potassium persulphate, ammonium persulphate, azo bis cyanovaleric acid and 2,2' azo bis amidinopropane dihydrochloride.

15. A process according to claim 10, wherein the radical initiator is a thermal initiator selected from potassium persulphate or 2,2' azo bis amidinopropane dihydrochloride.

16. A process according to claim 10, wherein the radical initiator is a redox initiator selected from sodium metabisulphite-potassium persulphate air or sodium sulphite-potassium persulphate.

17. A process according to claim 10, wherein the radical initiator is a photoinitiator and is 2,2' azo bis amidinopropane dihydrochloride.

* * * * *